United States Patent
Chis et al.

(10) Patent No.: US 12,388,720 B1
(45) Date of Patent: Aug. 12, 2025

(54) TRAINING A SUPERVISED MACHINE LEARNING MODEL FOR ANOMALY DETECTION

(71) Applicant: ELISA OYJ, Helsinki (FI)

(72) Inventors: Adriana Chis, Helsinki (FI); Petteri Lunden, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 19/118,772

(22) PCT Filed: Oct. 4, 2023

(86) PCT No.: PCT/FI2023/050567
§ 371 (c)(1),
(2) Date: Apr. 6, 2025

(87) PCT Pub. No.: WO2024/079385
PCT Pub. Date: Apr. 18, 2024

(30) Foreign Application Priority Data

Oct. 14, 2022 (FI) ........................................ 20225931

(51) Int. Cl.
- *H04L 29/06* (2006.01)
- *H04L 9/40* (2022.01)
- *H04L 41/16* (2022.01)

(52) U.S. Cl.
CPC .......... *H04L 41/16* (2013.01); *H04L 63/1425* (2013.01)

(58) Field of Classification Search
CPC .................................. H04L 41/16; H04L 63/1425
See application file for complete search history.

(56) References Cited

U.S. PATENT DOCUMENTS

| | | |
|---|---|---|
| 2018/0096261 A1 | 4/2018 | Chu et al. |
| 2018/0248905 A1* | 8/2018 | Côté .......................... G06N 3/08 |
| 2019/0138938 A1 | 5/2019 | Vasseur et al. |

(Continued)

OTHER PUBLICATIONS

Y. Dong, K. Chen, Y. Peng and Z. Ma, "Comparative Study on Supervised versus Semi-supervised Machine Learning for Anomaly Detection of In-vehicle CAN Network," 2022 IEEE 25th International Conference on Intelligent Transportation Systems (ITSC), Macau, China, 2022, pp. 2914-2919 (Year: 2022).*

(Continued)

*Primary Examiner* — Ka Shan Choy
(74) *Attorney, Agent, or Firm* — S. J. Intellectual Property Limited

(57) ABSTRACT

Example embodiments may relate to training of a supervised machine learning model for anomaly detection in a communication network. A computer-implemented method may comprise: detecting, by an unsupervised machine learning model, a plurality of anomalies in performance indicator data of a communication network; receiving labels for a first subset of the plurality of anomalies and labelling the first subset of the plurality of anomalies with the labels; training, based on the labelled first subset of the plurality of anomalies, a semi-supervised machine learning model for labelling anomalies; labelling, by the semi-supervised machine learning model, a second subset of the plurality of anomalies; and training, based on the labelled first and second subsets of the plurality of anomalies, a supervised machine learning model for detecting and/or classifying anomalies in the performance indicator data.

15 Claims, 4 Drawing Sheets

(56) References Cited

U.S. PATENT DOCUMENTS

| | | | |
|---|---|---|---|
| 2020/0351283 A1 | 11/2020 | Salunke et al. | |
| 2021/0124983 A1* | 4/2021 | Axenie | G06F 18/24323 |
| 2021/0264025 A1 | 8/2021 | Givental et al. | |
| 2021/0279644 A1* | 9/2021 | Givental | G06F 18/2321 |
| 2021/0281592 A1* | 9/2021 | Givental | G06N 20/10 |
| 2021/0374614 A1 | 12/2021 | Sampaio et al. | |
| 2023/0291755 A1* | 9/2023 | Siebel | H04L 63/1416 |

OTHER PUBLICATIONS

Pheeha Machaka et al, "Modelling DDoS Attacks in IoT Networks using Machine Learning", arXiv.org, Cornell University Library, 201 Olin Library Cornell University Ithaca, NY 14853, Jun. 20, 2022, XP091249047.

Chibani Siwar et al, "Machine learning approaches for the prediction of materials properties", APL Materials, American Institute of Physics, 2 Huntington Quadrangle, Melville, NY 11747, vol. 8, No. 8, Aug. 4, 2020, XP012249075, DOI: 10.1063/5.0018384.

* cited by examiner

TRAINING A SUPERVISED MACHINE LEARNING MODEL FOR ANOMALY DETECTION

TECHNICAL FIELD

Various example embodiments generally relate to the field of communication networks. Some example embodiments relate to machine learning models configured to detect or classify anomalies in performance indicator data of a communication network, or training such machine learning models.

BACKGROUND

Operation of a communication network may be analysed and optimised in many different ways, for example based on key performance indicators (KPI) of the network. Anomaly detection is a form of data analysis with a goal to identify rarely appearing phenomena in a set of data, for example events that significantly deviate from the rest of the data. Anomaly detection may be used in context of communication networks to detect undesired network behaviour, for example based on the KPIs. Detected anomalies may be then analysed and corrective actions may be performed accordingly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments of the present disclosure improve anomaly detection in a communication network. This benefit may be achieved by the features of the independent claims. Further example embodiments are provided in the dependent claims, the description, and the drawings.

According to a first aspect, a computer-implemented method is disclosed. The method may comprise: detecting, by an unsupervised machine learning model, a plurality of anomalies in performance indicator data of a communication network; receiving labels for a first subset of the plurality of anomalies and labelling the first subset of the plurality of anomalies with the labels; training, based on the labelled first subset of the plurality of anomalies, a semi-supervised machine learning model for labelling anomalies; labelling, by the semi-supervised machine learning model, a second subset of the plurality of anomalies; and training, based on the labelled first and second subsets of the plurality of anomalies, a supervised machine learning model for detecting and/or classifying anomalies in the performance indicator data.

According to an example embodiment of the first aspect, the method may comprise: performing a first feature extraction to extract features from the performance indicator data; and detecting, by the unsupervised machine learning model, the plurality of anomalies in the performance indicator data based on the extracted features of the performance indicator data.

According to an example embodiment of the first aspect, the method may comprise: determining an anomaly score or ranking for the plurality of anomalies; and determining the first subset of the plurality of anomalies based on the anomaly score or ranking.

According to an example embodiment of the first aspect, the method may comprise: determining the first subset of the plurality of anomalies based on uncertainty sampling of the plurality of anomalies.

According to an example embodiment of the first aspect, the method may comprise: receiving the labels for the first subset of the plurality of anomalies via a user interface.

According to an example embodiment of the first aspect, the method may comprise: outputting an indication of the labelling of the second subset of the plurality of anomalies via the user interface; receiving validation of the labelling of the second subset of the plurality of anomalies via the user interface, or updating at least one label of the second subset of the plurality of anomalies based on user input received via the user interface.

According to an example embodiment of the first aspect, the method may comprise: re-training the supervised machine learning model, in response to receiving further labels for the plurality of anomalies via the user interface and/or in response to labelling further anomalies of the plurality of anomalies by the semi-supervised machine learning model.

According to an example embodiment of the first aspect, the method may comprise: disabling the unsupervised machine learning model and the semi-supervised machine learning model, in response to determining that performance of the supervised anomaly detection exceeds performance of the semi-supervised machine learning model, and/or in response to determining that the re-training no longer improves the performance of the supervised machine learning model, wherein the performance of the supervised machine learning model and/or the performance of the semi-supervised machine learning model is evaluated based on a test dataset comprising the first and second subsets of the plurality of anomalies.

According to an example embodiment of the first aspect, the method may comprise: re-enabling the unsupervised machine learning model and/or the semi-supervised machine learning model and resuming re-training of the supervised machine learning model, in response to detecting a predetermined degradation in the performance of the supervised machine learning model, when evaluated with the test dataset.

According to an example embodiment of the first aspect, the method may comprise: detecting and/or classifying, by the supervised machine learning model, at least one anomaly in the performance indicator data.

According to an example embodiment of the first aspect, the method may comprise: outputting an indication of the detected and/or classified at least one anomaly in the performance indicator data.

According to an example embodiment of the first aspect, the method may comprise: outputting the indication of the detected and/or classified at least one anomaly via the user interface; and receiving validation of the detected and/or classified at least one anomaly via the user interface, or re-training the semi-supervised machine learning model, in response to receiving an indication of incorrect detection and/or classification of the at least one anomaly via the user interface.

According to an example embodiment of the first aspect, the method may comprise: adjusting at least one parameter of the communication network, in response to detecting and/or classifying the at least one anomaly in the performance indicator data.

According to a second aspect, an apparatus is disclosed. The apparatus may comprise means for performing any example embodiment of the method of the first aspect.

According to a third aspect, an apparatus is disclosed. The apparatus may comprise at least one processor; and at least one memory including computer program code; the at least one memory and the computer program code configured, when executed by the at least one processor, to cause the apparatus at least to perform any example embodiment of the method of the first aspect.

According to a fourth aspect, an apparatus is disclosed. The apparatus may comprise a computer-implemented supervised machine learning model obtainable by any example embodiment of the method of the first aspect.

According to a fifth aspect, a computer program or a computer program product is disclosed. The computer program or computer program product may comprise program code configured, when executed by a processor, to cause an apparatus at least to perform any example embodiment of the method of the first aspect.

According to a sixth aspect, a (non-transitory) computer readable medium is disclosed. The (non-transitory) computer readable medium may comprise computer program code configured, when executed by a processor, to cause an apparatus to perform any example embodiment of the method of the first aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
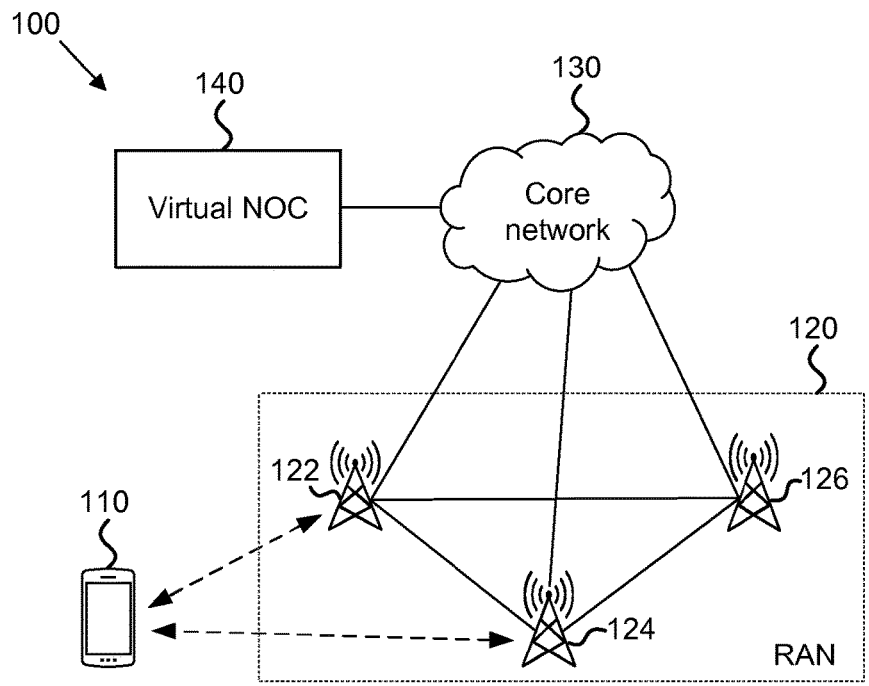
FIG. 1 illustrates an example of a wireless communication network.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Operational characteristics of a radio network may be analysed and optimized in many different ways, for example based on key performance indicators (KPI) collected from the radio access network (RAN). KPIs may include one or more of the following: a peak data rate, peak spectral efficiency, data rate experienced by a user equipment (UE), area traffic capacity, latency, connection density, average spectral efficiency, energy efficiency, reliability of transmission, a setup success rate, a connection drop rate, user average throughput, handover count, or a handover success rate. KPIs may be associated with a single cell or a group of cells and they may be collected for uplink and/or downlink. In general, KPIs may be collected from various network devices or elements and the KPIs may not include cell level KPIs. For example, user level KPIs may be used alternatively, or in addition to cell level KPIs. The methods disclosed herein may be therefore based on any suitable type of KPIs, and not only cell level KPIs. Collecting KPIs enables network operators to detect and correct anomalous behaviour in the network. Since the amount and type of KPIs may be high, it may be challenging for a human operator to detect anomalies and therefore machine learning may be exploited in anomaly detection.

An unsupervised machine learning model may analyse data in order to detect hidden structures or patterns within the data. In anomaly detection this may be exploited to identify samples of the input data set that appear to be inconsistent with the rest of the data set. Notably, unsupervised anomaly detection models may be operated without labelled training data, that is, without telling the model which samples of the data set should be considered as anomalous. Examples of machine learning models suitable for unsupervised anomaly detection include clustering techniques, such as KNN (k nearest neighbours), or outlier techniques such as isolation forest. For example, in case of KNN any KPI data having a distance higher than a threshold from the closest cluster centre may be regarded as anomalous. The distance may be also used to assess how anomalous the KPI data, for example to determine an anomaly score for the detected anomaly or a rank different anomalies based on how anomalous they are, as will be further described below. Performance (e.g., accuracy) of unsupervised machine learning models, for example in terms of number false positives in anomaly detection, may be worse than performance of semi-supervised or fully supervised anomaly detection methods. A false positive may refer to a situation, where an anomaly is detected even though the KPI data does not reflect any actual network anomaly.

In semi-supervised learning, a small amount of labelled training data may be combined with unlabelled training data to train a machine learning model. The resulting machine learning model may be called a semi-supervised machine learning model. For example, in transductive learning, a small amount of labelled data may be used to train the semi-supervised model to infer correct labels for the unlabelled data. Examples of semi-supervised machine learning models include generative models, such as for example generative adversarial networks, and graph-based models, such as for example label propagation models.

In supervised learning, training may be performed using labelled training data. The resulting machine learning model may be called a (fully) supervised machine learning model.

Examples of supervised machine learning models include classifiers, e.g. neural networks, which may be trained to predict a class of a data sample from a given set of classes, for example to classify data as anomalous or not (cf. detect an anomaly) and optionally select a class for a detected anomaly. In general, detecting an anomaly may refer to detecting presence of an anomaly, for example classifying data as anomalous or not. Classification may refer to determining a class (e.g., a type) of a detected anomaly and/or assigning a label indicative of the class to an anomaly.

Semi- and fully supervised machine learning models may be trained by comparing the output of the model to the desired output (labels), which may be also referred to as ground-truth data. An output of the model may for example comprise a probability distribution over the set of anomalies, for example as a vector where each element of the vector represents a probability of the input data of the model to belong to a certain class of anomalies (e.g. a coverage hole, interference, call drops caused by handover failures). Antenna uptilting may be applied as a corrective action for anomalies belonging to the class of coverage hole. Antenna downtilting may be applied as a corrective action for anomalies belonging to the class of interference. Update (e.g., optimization) of handover parameters may be applied as a corrective action for anomalies belonging to the class of call drops due to handover failures. In the simplest case, the output of the model may comprise a two-element vector that represents probabilities of the input data being anomalous or not. Training of a machine learning model may include iteratively updating parameters of the model until it is able to perform the task with sufficient accuracy. A loss function, comprising for example the KPIs as input data and the labels as ground truth data, may be provided to assess performance of the model. For example, in case of anomaly classification, the loss function may compare the desired classes (ground truth data) to the class predicted by the ML model. Parameters of the model may be updated at each iteration such that the loss function decreases, that is, the output of the model becomes closer to the desired output.

In continuous network monitoring solutions, the identified KPI anomalies may be configured to cause synthetic alarms, which may be processed further automatically, e.g., correlating occurrence of the detected anomalies with other data such as maintenance or service logs, weather data, or the like. Alternatively, or additionally, the alarms may be processed manually by a human operator, including expert analysis in order to determine corrective action(s) to be taken. In continuous KPI monitoring, anomaly detection may be performed based on network KPIs from time to time, for example periodically or at specific time intervals, as configured by the network automation system, for example every 6, 12, 24, or 48 hours.

Some anomalies may be generated by intentional network changes, such as for example adjustments made by automated algorithms, or by unusual user mobility and traffic patterns, or even weather conditions. Such anomalies may not require any action. Anomalies may be however also caused by equipment faults or misconfiguration and it may be desired to correct such anomalies. In order to automate this process and make it as reliable as possible, for example by reducing the number of false alarms, it may be desired to increase accuracy of KPI anomaly detection beyond performance of purely unsupervised machine learning methods.

A target for network automation may be to automatically detect network faults and to determine the underlying fault causing the problem (e.g. misconfigured handover parameters). However, many of the statistical anomalies identified in KPI data may not be indicative of any severe problem that would degrade customer experience. It may be therefore desired to avoid such anomalies triggering alarms, for example to be processed in a virtual network operation centre (NOC). Furthermore, KPI time series are inherently noisy, especially at individual cell level, and the network may be constantly changing, thereby bringing up new kinds of problems. Furthermore, the number of monitored KPIs may be large.

Performance of unsupervised anomaly detection may be improved by semi-supervised or fully supervised training methods. However, the amount of labelled training data available for such training may be small. Experts may be capable of analysing and resolving only a limited number of anomalies due to the time-consuming manual work associated therewith. Moreover, the resolved anomalies may not be systematically recorded, for example in a database. It may be also difficult to hardcode rules for distinguishing problem situations from non-problematic anomalies, for example because each KPI may need to be treated independently. It may be therefore difficult to set up accurate rules for distinguishing between problem situations and non-problematic anomalies.

Example embodiments of the present disclosure provide a three-step approach for training a machine learning model for detection and/or classification of anomalies in KPI data. The disclosed approach is based on interplay of unsupervised and supervised machine learning models. Expert-in-the-loop input may be used for validating outputs of the models at various stages and hence to generate labels for further training. The disclosed architecture implements a hierarchical solution that ends with a successful domain specific anomaly detection, even when no labelled data is initially available. The solution may increasingly rely on use of labels once they start coming from the expert or the semi-supervised model.

An unsupervised machine learning model may be provided at a first step. This step may provide only limited accuracy, as described above. However, this step may be beneficial for initializing the system, for example because anomalies may be rare, and it may not be practical for a human user (cf. expert) to find them from raw unfiltered KPI data. At least some of the anomalies detected by the unsupervised machine learning mode may be provided to the user for labelling.

A semi-supervised machine learning model may be provided at a second step. The semi-supervised machine learning model may combine the results of the unsupervised method with information drawn from small number of labelled data provided by the user. Thanks to the labels, the accuracy of anomaly detection/classification may be improved when compared to the unsupervised stage. The accuracy of the semi-supervised machine learning model may be improved over time as the number of labels provided by the user increases.

A (fully) supervised machine learning model may be provided at a third step. The supervised machine learning model may use the labelled anomalies from the user but also labels produced by the semi-supervised machine learning model. Enriching the input labels with the output of the semi-supervised machine learning model enables the supervised model to learn faster. At this step, the accuracy of the model may be further improved. Accuracy of a machine learning model may refer to its ability to reflect semantic understanding of anomalies in telco KPIs, as interpreted by the human user.

FIG. 1 illustrates an example of a wireless communication network. Communication network 100 may comprise one or more devices, which may be also referred to as client nodes, user nodes, or user equipment (UE). An example of a device is UE 110, which may communicate with one or more access nodes of a radio access network (RAN) 120. An access node may be also referred to as an access point or a base station. Access nodes 122, 124, 126 of RAN 120 may for example comprise $5^{th}$ generation access nodes (gNB). Communications between UE 110 and access nodes 122, 124, 126 may be bidirectional and hence any of these entities may be configured to operate as a transmitter, and/or a receiver.

An access node may provide communication services within one or more cells, which may correspond to geographical area(s) within coverage of the access node. Communication network 100 may further comprise a core network 130, which may comprise various network functions (NF) for establishing, configuring, and controlling data communication sessions of UE 110. A virtual NOC 140 may be configured to perform network optimization based on various information (e.g. KPIs) gathered form RAN 120 and/or core network 130, as will be further described below. Training of the ML model(s) may be performed by virtual NOC 140, or in general by a training system comprising at least one apparatus configured to perform the training. Trained ML model(s) may be deployed for inference phase at any suitable network device, for example associated with virtual NOC 140. Furthermore, a network automation system (not shown) may be configured to control operational parameters of communication network 100, for example RAN 120, based on detected anomalies. The network automation system may be implemented as part of virtual NOC 140, or be communicatively coupled to virtual NOC 140, for example to received information about detected anomalies.

Communication network 100 may be configured for example in accordance with the $4^{th}$ or $5^{th}$ generation (4G, 5G) digital cellular communication network, as defined by the 3rd Generation Partnership Project (3GPP). In one example, communication network 100 may operate according to 3GPP (4G) LTE (Long-Term Evolution) or 3GPP 5G NR (New Radio). It is however appreciated that example embodiments presented herein are not limited to these example networks and may be applied in any present or future wireless or wired communication networks, or combinations thereof, for example other type of cellular networks, short-range wireless networks, multicast networks, fiber networks, or the like.

Figure 2:
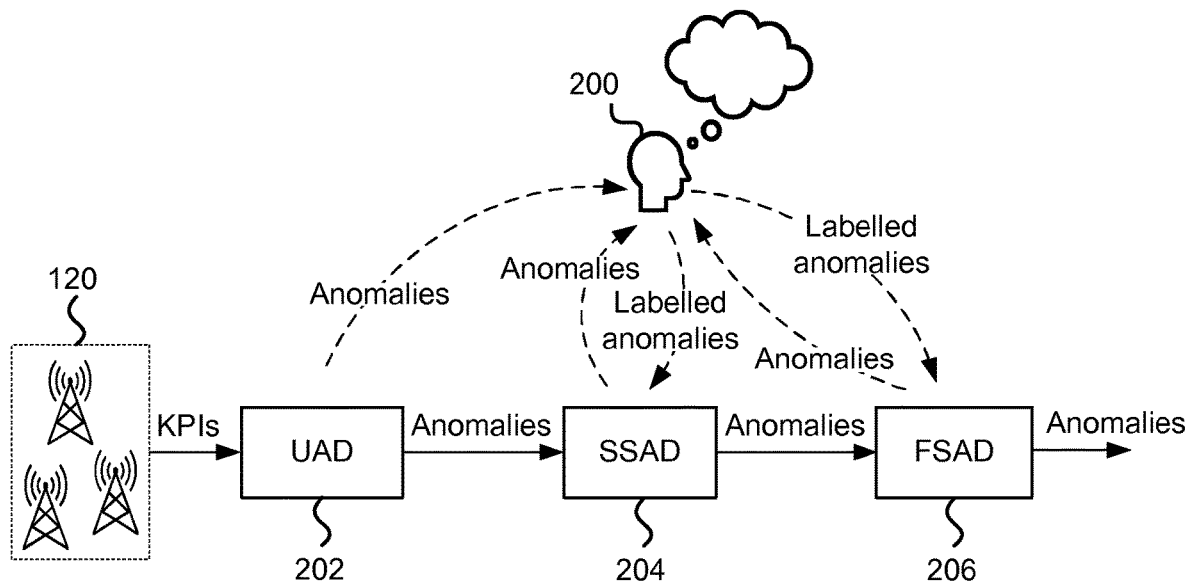
FIG. 2 illustrates an example of a system architecture for training a supervised machine learning model for detecting and/or classifying anomalies.

FIG. 2 illustrates an example of a system architecture for training a supervised machine learning model for detecting and/or classifying anomalies. Unsupervised anomaly detector (UAD) 202 may receive KPIs from a communication network, for example RAN 120. UAD 202 may be configured to perform anomaly detection for the KPI data. KPI data detected as anomalous may be presented to user 200 via a user interface. Alternatively, or additionally, the anomalous KPI data may be provided to a semi-supervised anomaly detector (SSAD) 204. User 200 may label at least part of the anomalous KPI data and provide the labelled anomalies to SSAD 204. These labelled anomalies may comprise a first subset of the anomalies detected by UAD 202.

SSAD 204 may be trained in a semi-supervised manner, using the labelled anomalies received from user 200. SSAD 204 may be trained for detecting and/or labelling (classifying) anomalies in KPI data. SSAD 204 may be used to detect and/or label the KPI data that has been detected by UAD 202 as anomalous. It is noted that accuracy of UAD 202 may be relatively low, for example compared to accuracy of SSAD 204 or supervised anomaly detection methods in general, thereby resulting in a large amount of KPI data to be processed by SSAD 204. Thanks to semi-supervised training, accuracy of SSAD 204 may be higher than accuracy of UAD 202. As noted above, SSAD 204 may be trained not only to detect anomalies but also to classify them, e.g., to generate labels for the anomalies detected by UAD 202.

Labels generated by SSAD 204 may be presented to user 200 via the user interface to enable user 200 to verify/correct the labels generated by SSAD 204. User 200 may also continue to label the anomalous KPI data received from UAD 202. User 200 may provide the anomalies labelled by user 200 and/or SSAD 204 to a fully supervised anomaly detector (FSAD) 206. Anomalies labelled by SSAD 204 may comprise a second subset of the anomalies initially detected by UAD 202. The second subset may not include anomalies of the first subset.

FSAD 206 may be trained in a supervised manner, using the labelled anomalies received from user 200, including the anomalies originally labelled by SSAD 204. After training, FSAD 206 may independently detect and/or classify anomalies in KPI data, for example KPI data identified as anomalous by UAD 202 and/or SSAD 204, or raw KPI data of RAN 120. The output of FSAD 206, for example anomalies detected and/or classified by FSAD 206, may be presented to user 200. User 200 may verify/correct labels generated by FSAD 206. The corrected labels may be used for further training of FSAD 206.

UAD 202, SSAD 204, and FSAD 206 are provided as examples of unsupervised, semi-supervised, and supervised ML models, and they may be implemented as any suitable type/structure of machine learning models, as described above.

Figure 3:
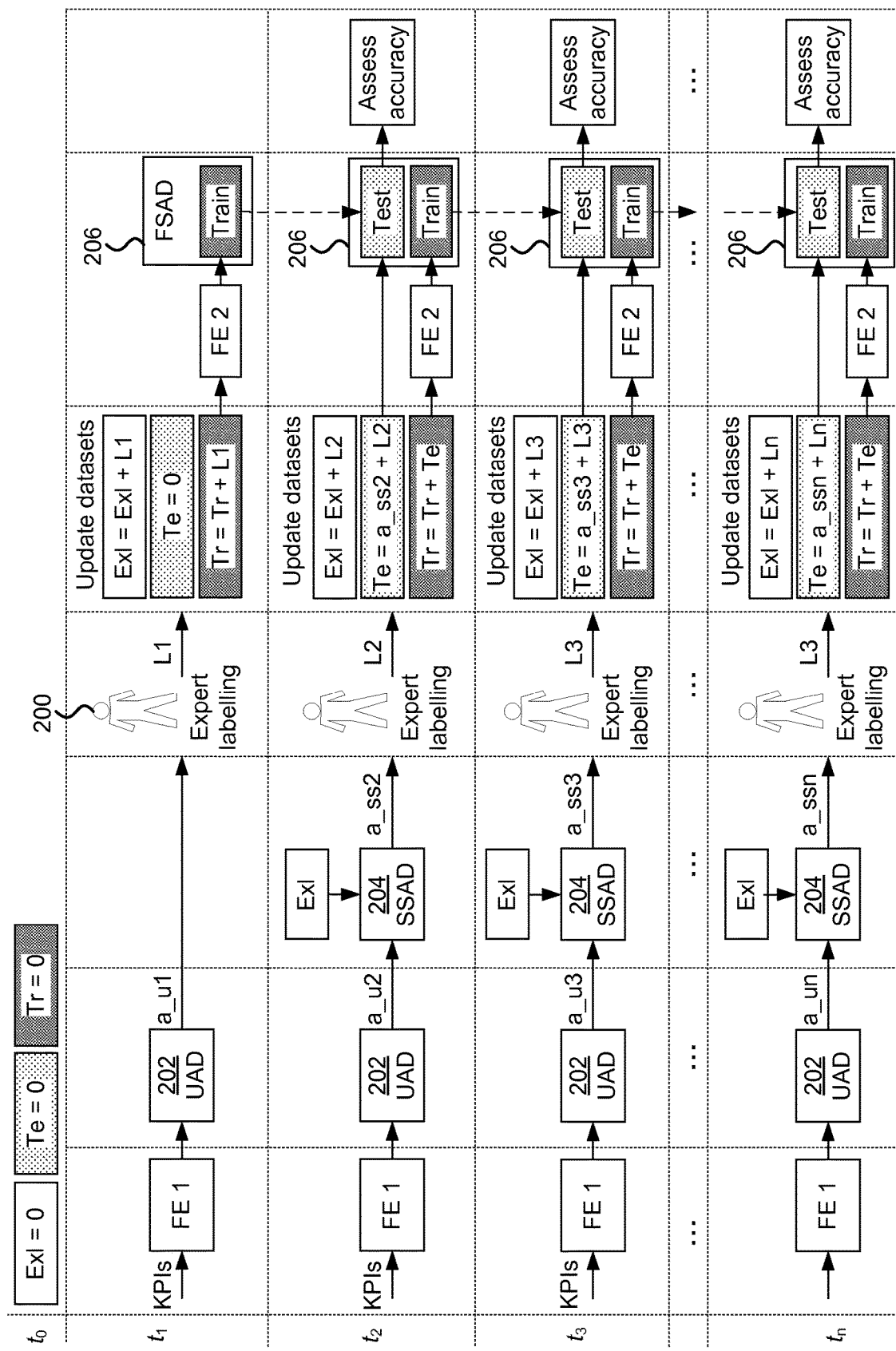
FIG. 3 illustrates an example of a step-by-step diagram for training a supervised machine learning model for detecting and/or classifying anomalies.

FIG. 3 illustrates an example of a step-by-step diagram for training a supervised machine learning model for detecting and/or classifying anomalies. Operations are described for different time instants or periods $t_0$ to $t_n$. Initially no labeled data may be available. Training of the ML model(s) may be performed by a training system, for example using the architecture of FIG. 2.

At to, a set of expert labels Ex1 may be initialized as an empty data set. Similarly, a training data set, Tr, and a test data set, Te, may be initialized as empty data sets. Training may be therefore initiated without training data or associated labels.

At $t_1$, UAD 202 may detect anomalies from the KPI data, resulting in a set of candidate anomalies, a_ul. The KPI data may be provided in any suitable format, for example as a time series of KPI measurements, structured for example as vector(s) or tensor(s) with suitable dimensions. Optionally, a first feature extraction (FE 1) may be performed for the KPI data before anomaly detection by UAD 202. Feature extraction may include any suitable operation to pre-process the KPI data, for example to remove irregularities in the KPI data. This may be done by means of statistical operations or otherwise summarizing the KPI data. Alternatively, or additionally, a feature extractor model such as a neural network may be used. The first feature extraction may provide as output the extracted features of the KPI data. The set of candidate anomalies, a_ul, may comprise the KPI data or the extracted features detected as anomalous by UAD 202.

Figure 4:
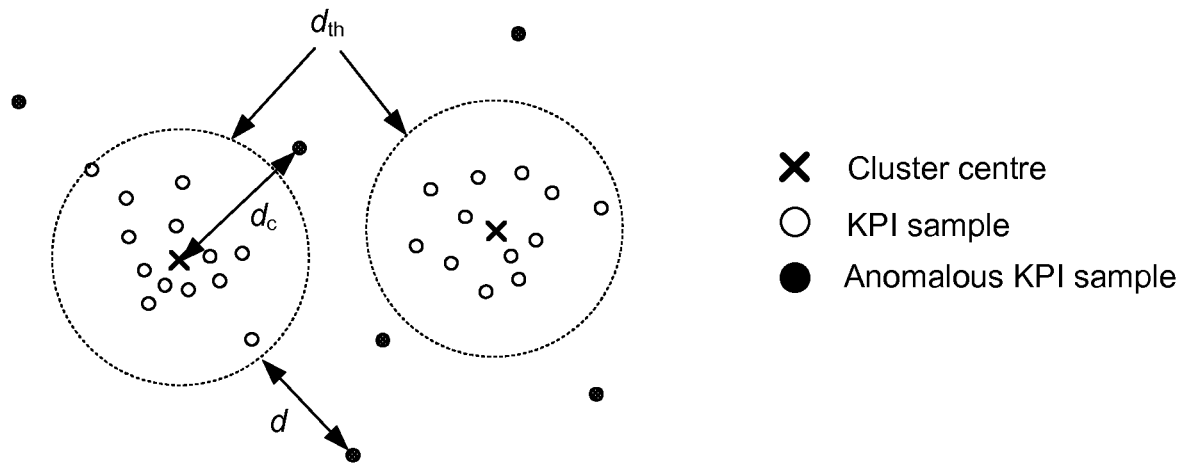
FIG. 4 illustrates an example of determining anomalous KPI samples and their anomaly scores.

Since set a_ul may include a large number of candidate anomalies detected by UAD 202, it may be beneficial to filter set a_ul before presenting it to user 200. An anomaly score or ranking may be therefore defined for the detected anomalies. An anomaly score or ranking may be determined for example based on how far each anomaly is from being considered as normal KPI data and not anomalous. An example of determining an anomaly score is illustrated in FIG. 4. In case of KNN the anomaly score may comprise the distance ($d_c$) from closest cluster centre (x) or the distance (d) to a threshold distance $d_{th}$ (from the cluster centre) used for determining whether the KPI data is anomalous. The distances may be determined using any suitable measure of similarity between vectors or tensors. In case of isolation forest, an anomaly score/ranking may be determined for example based on the number of partitions in the algorithm to isolate the KPI sample.

In one example, the most anomalous cases, as determined by the anomaly score/ranking, may be selected to the set of candidate anomalies, a_ul. This may be beneficial because it enables user 200 to quickly label the candidate anomalies. Alternatively, set a_ul may be determined based on uncertainty sampling of the anomalies detected by UAD 202, or by any other suitable active learning type of label querying from user 200. In uncertainty sampling, labels may be queried from user 200 for anomalies, for which the current prediction is most uncertain. For example, set a_ul may be selected to include borderline anomalous cases. This way user 200 may be presented cases which may be more difficult to classify. The most anomalous data may be directly provided to SSAD 204, because it may be more likely that SSAD 204 is able to correctly label the most anomalous data. This may speed up label generation, because input form user 200 may not be needed for many of the anomalies detected by UAD 202.

Referring back to FIG. 3, set a_ul may be presented to user 200 via a user interface. User 200 may perform expert labelling for at least part of set a_ul, thereby generating a set of labelled anomalies, L1. Labels of set L1 may be received via the user interface and be associated with respective anomalous data. The set of expert labels, Exl, may be updated with the labelled anomalies (Exl=Exl+L1). The training data set, Tr, may be updated with the received set of labelled anomalies (Tr=Tr+L1).

FSAD 206 may be then trained based on the training data set, Tr. However, a second feature extraction (FE 2) may be performed before inputting the training data set, Tr, to FSAD 206. The second feature extraction may be however different from the first feature extraction, for example to account for different input dimensions of SSAD 204 and FSAD 206.

At $t_2$, UAD 202 may perform anomaly detection similar to $t_1$, to output a set of candidate anomalies, a_u2. Set a_u2 may be provided to SSAD 204, which may be trained in a semi-supervised manner using the set of labelled data, L1, obtained at $t_1$. SSAD 204 may perform anomaly detection and at least partially also labelling of set a_u2 to obtain another set of anomalies, a_ss2. At least part of set a_ss2 may be presented to user 200. For example, an indication of the labels generated by SSAD 204 may be output via the user interface. User 200 may validate labelling of SSAD 204, update any incorrect labels, or label still unlabelled anomalies of set a_ss2, to obtain another set of labels, L2. Validation of the labelling by SSAD 204 may be received from user 200 via the user interface. Labels of set a_ss2 may be updated based on user input received from user 200 via the user interface. User 200 may provide an indication of the incorrect labelling by SSAD 204 via the user interface. In response to receiving the indication of incorrect labelling, the training system may determine to re-train SSAD 204. Training of FSAD 206 with labels generated by SSAD 204 may be suspended, for example until re-training of SSAD 204 is completed. This improves training by enabling user 200 to control label generation by SSAD 204. For example, erroneous labels generated too early with insufficiently performing SSAD 204 may be avoided.

The set of expert labels may be updated as Exl=Exl+L2. The training data set may be updated as Tr=Tr+L2. Training of FSAD 206 may continue with the updated training data set, Tr. The output of SSAD 204 and label set L2 may be added to the test data set: Te=a_ss2+L2.

Accuracy of FSAD 206 may be tested with the test data set, Te. For example, performance of SSAD 204 and FSAD 206 may be evaluated with the test data set, using the anomalous data of Te as input to both SSAD 204 and FSAD 206 and using the associated labels as ground truth data. Performance of SSAD 204 and FSAD 206 may be compared, for example based on the number of correctly detected/classified anomalies. If performance of FSAD 206 exceeds performance of SSAD 204, SSAD 204 and/or UAD 202 may be disabled. Disabling a machine learning model, such as for example UAD 202 or SSAD 204, may comprise terminating execution of the model. Anomaly detection may be subsequently performed by FSAD 206 without UAD 202 and/or SSAD 204. UAD 202 and SSAD 204 may be advantageously used for training FSAD 206. However, UAD 202 and/or SSAD 204 may be disabled to save power and computing resources, once FSAD 206 has been sufficiently trained.

It is also possible to assess accuracy of FSAD 206 without comparing its performance to SSAD 204. For example, (re)-training of FSAD 206 may be determined to be completed, if the training no longer improves performance of FSAD 206, for example in terms of the number of correctly detected/classified anomalies in the test data set, Te. UAD 202 and/or SSAD 204 may be then disabled, as described above. As a result of the operations at $t_1$ and $t_2$, training data set Te may include anomalies labelled by user 200 (cf. first subset of anomalies) and SSAD 204 (cf. second subset of anomalies).

In the example of FIG. 3, the training system may determine at $t_2$ that accuracy of FSAD 206 is not yet sufficient. Hence, training and testing of FSAD 206 may continue at $t_3$ similar to $t_2$, by detecting more anomalies with UAD 202, detecting/labelling more anomalies with SSAD 204 or by user 200, and further training FSAD with the expanded set of labelled training data Tr. In general, training may be performed for n steps $t_1$ to $t_n$. The gradually increasing amount of labelled training data may progressively improve performance of FSAD 206. FSAD 206 may be thus re-trained, in response to receiving further labels for the anomalies from user 200 and/or SSAD 204. Once accuracy of FSAD 206 is good enough, UAD 202 and SSAD 204 may be disabled, as described above. It is however possible to keep UAD 202 enabled while performing inference with FSAD 206, in order to reduce the amount of data to be processed by FSAD 206.

Performance of FSAD 206 may be monitored during inference phase, for example after disabling UAD 202 and SSAD 204. If performance of FSAD 206 with the test data set, Te, is detected to degrade, UAD 202 and/or SSAD 204 may be re-enabled to resume re-training of FSAD 206. Performance of FSAD 206 may be for example compared to a predetermined level of degradation, provided for example as a threshold for degradation in the number of correctly detected/classified anomalies in the test data set, Te. UAD 202 and/or SSAD 204 may be re-enabled if performance of SSAD has degraded more than the predetermined limit for degradation. The predetermined limit may be preconfigured at a device configured to perform the training of FSAD 206, for example stored at its memory. Re-enabling a ML model may comprise resuming execution of the ML model. UAD 202 and SSAD 204 may therefore start detecting and labelling more anomalies for training FSAD 206.

Whenever using FSAD 206 for inference, that is, detecting and/or classifying anomaly(ies) in KPI data, an output may be provided by the network device comprising FSAD 206 in order to inform a human operator about the detected anomaly and optionally its classification. The human operator may then determine necessary actions for recovering from the anomaly(ies). For example, the human operator may adjust parameter(s) of communication network 100, for example RAN 120. The indication of the detected/classified anomaly may for example include a visual indication (e.g. on a display), a sound, or other alert. Alternatively, or additionally, the output may be provided to the network automation system such as virtual NOC 140, for example as an alert signal, which may cause the network automation system to perform, or cause performance of, corrective action(s) in order to recover from the anomaly. Corrective action(s) may depend on the class of anomaly in question. A corrective action may comprise adjustment of parameter(s) of communication network 100.

Anomalies detected/classified by FSAD 206 may be validated by user 200 during inference phase. For example, user 200 may provide validation of an anomaly detected/classified by FSAD 206 via the user interface. User 200 may also provide to the training system, via the user interface, an indication of incorrect labelling by FSAD 206. Based on the feedback from user 200, for example the indication of incorrect labelling or a ratio between validly and incorrectly labelled anomalies, as indicated by user 200, the training system may determine to re-train FSAD 206. This improves anomaly detection by FSAD 206 by enabling further training based on feedback during the inference phase.

Figure 5:
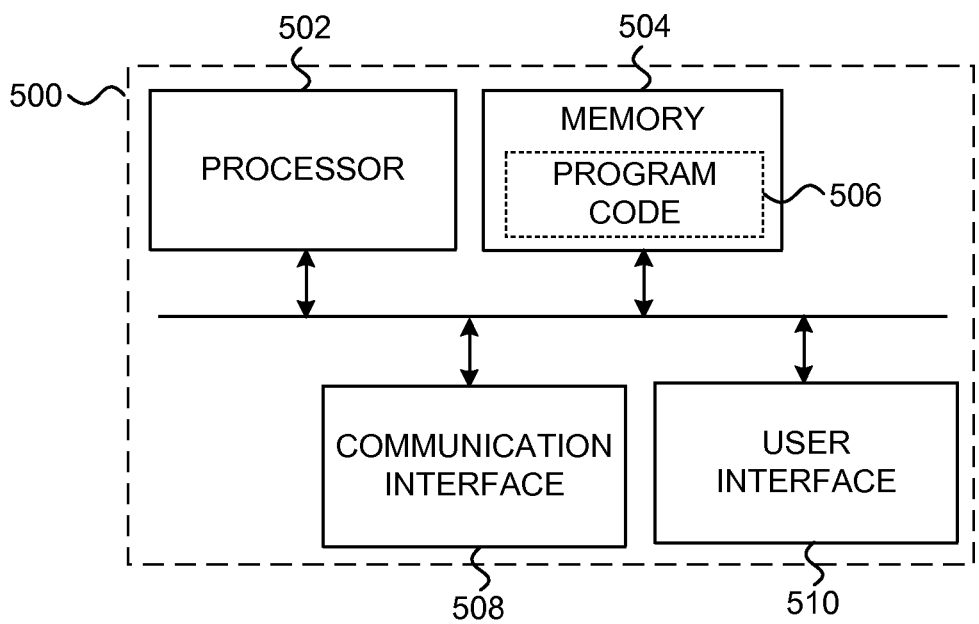
FIG. 5 illustrates an example of an apparatus configured to practise one or more example embodiments.

FIG. 5 illustrates an example embodiment of an apparatus, for example a server, configured to perform one or more example embodiments. Apparatus 500 may be for example used to implement virtual NOC 140, a training system, and/or a network automation system. Apparatus 500 may comprise at least one processor 502. The at least one processor 502 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 500 may further comprise at least one memory 504. The at least one memory 504 may be configured to store, for example, computer program code or the like, for example operating system software and application software. The at least one memory 504 may comprise one or more volatile memory devices, one or more non-volatile memory devices, and/or a combination thereof. For example, the at least one memory 504 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 500 may further comprise a communication interface 508 configured to enable apparatus 500 to transmit and/or receive information to/from other devices, functions, or entities, for example network functions of core network 130 or another (remote) device operated by user 200. Communication interface 510 may be for example used to transmit indication(s) of detected and/or classified anomalies to the other device, for example for labelling by user 200, and/or to receive labels for the presented anomalies from the other device.

Apparatus 500 may further comprise a user interface 510 comprising an input device and/or an output device. The input device may take various forms such a keyboard, a mouse, a touch screen, or one or more embedded control buttons. The output device may for example comprise a display, a speaker, a vibration motor, or the like. User interface 510 may be for example used to present detected and/or classified anomalies to user 200, and/or to receive labels for the presented anomalies.

When apparatus 500 is configured to implement some functionality, some component and/or components of apparatus 500, such as for example the at least one processor 502 and/or the at least one memory 504, may be configured to implement this functionality. Furthermore, when the at least one processor 502 is configured to implement some functionality, this functionality may be implemented using (computer) program code 506 comprised, for example, in the at least one memory 504.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 500 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

A ML model, for example a neural network, may be implemented by software and/or hardware. For example, parameters (e.g. weights) of a neural network may be stored at the at least on memory 504 and structured such that flow of input data through layers of the neural network is implemented, when executing associated program instructions.

In general, apparatus 500 comprises means for performing at least one method described herein. In one example, the means comprises the at least one processor 502, the at least one memory 504 including program code 506 configured to, when executed by the at least one processor, cause the apparatus 500 to perform the method. In general, computer program instructions may be executed on means providing generic processing functions. Such means may be embedded for example in a personal computer, a smart phone, a network device, or the like. The method(s) may be thus computer-implemented, for example based on algorithm(s) executable by the generic processing functions, an example of which is the at least one processor 502.

Apparatus 500 may comprise a computing device such as for example a server, a network device, a network function device, or the like. Although apparatus 500 is illustrated as a single device it is appreciated that, wherever applicable, functions of apparatus 500 may be distributed to a plurality of devices, for example to implement example embodiments as a cloud computing service.

Figure 6:
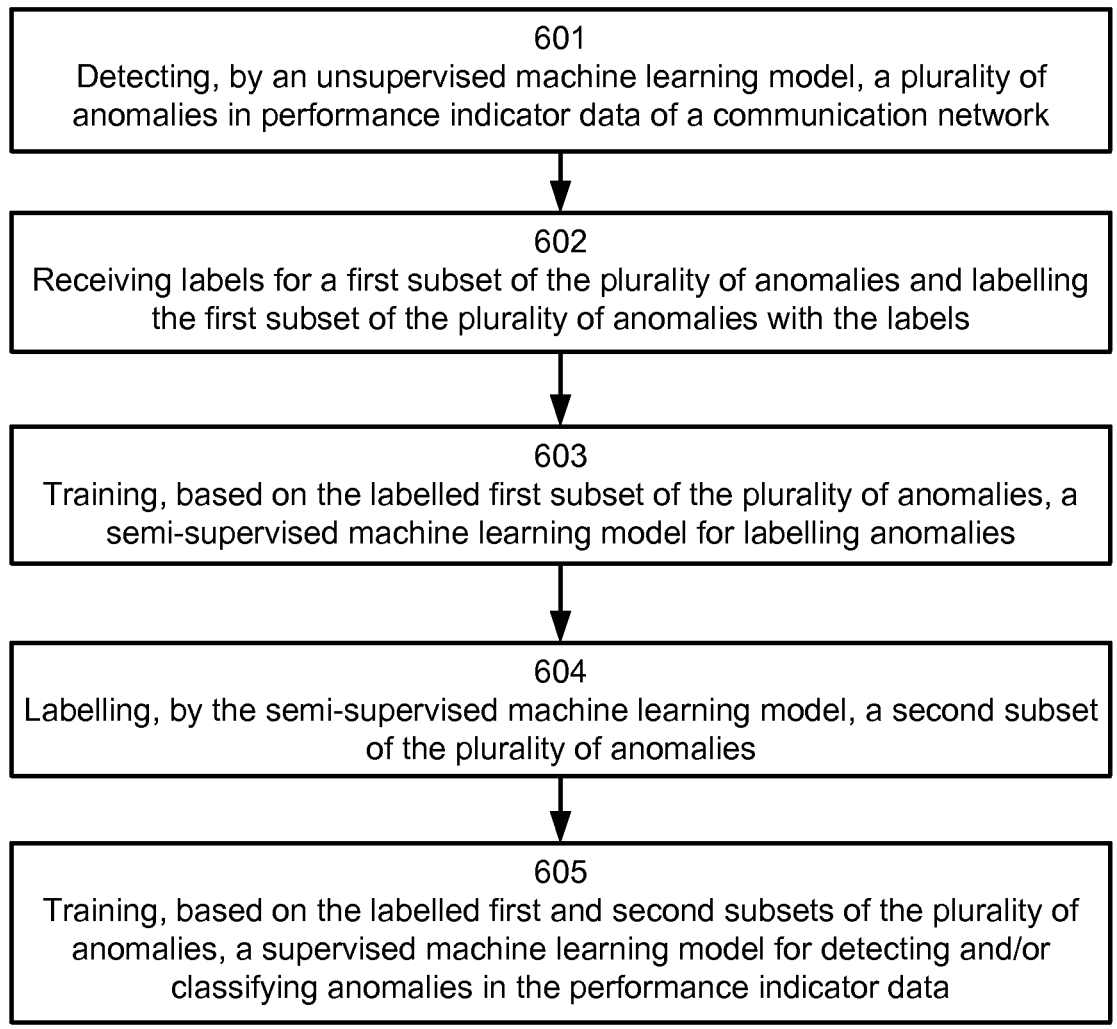
FIG. 6 illustrates an example of a method for training a machine learning model for detecting and/or classifying anomalies in performance indicator data of a communication network.

FIG. 6 illustrates an example of a computer-implemented method for training a machine learning model for detecting and/or classifying anomalies in performance indicator data of a communication network.

At 601, the method may comprise detecting, by an unsupervised machine learning model, a plurality of anomalies in performance indicator data of a communication network.

At 602, the method may comprise receiving labels for a first subset of the plurality of anomalies and labelling the first subset of the plurality of anomalies with the labels.

At 603, the method may comprise training, based on the labelled first subset of the plurality of anomalies, a semi-supervised machine learning model for labelling anomalies.

At 604, the method may comprise labelling, by the semi-supervised machine learning model, a second subset of the plurality of anomalies.

At 605, the method may comprise training, based on the labelled first and second subsets of the plurality of anomalies, a supervised machine learning model for detecting and/or classifying anomalies in the performance indicator data.

Further features of the method directly result for example from the functionalities of virtual NOC 140, the training system, and/or the network automation system as described throughout the specification and in the appended claims, and are therefore not repeated here. Different variations of the method may be also applied, as described in connection with the various example embodiments.

An apparatus, such as for example a server or a network device may be configured to implement one or more network functions or entities, may be configured to perform or cause performance of any aspect of the method(s) described herein. Further, a computer program, a computer program product, or a (non-transitory) computer readable medium may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s). An apparatus, a computer program (product), or a (non-transitory) computer-readable medium may comprise, e.g. stored therein, a machine learning model obtainable by the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A computer-implemented method, comprising:
   detecting, by an unsupervised machine learning model, a plurality of anomalies in performance indicator data of a communication network;
   receiving labels for a first subset of the plurality of anomalies and labelling the first subset of the plurality of anomalies with the labels;
   training, based on the labelled first subset of the plurality of anomalies, a semi-supervised machine learning model for labelling anomalies;
   labelling, by the semi-supervised machine learning model, a second subset of the plurality of anomalies;
   training, based on the labelled first and second subsets of the plurality of anomalies, a supervised machine learning model for detecting and/or classifying anomalies in the performance indicator data; and
   disabling the unsupervised machine learning model and/or the semi-supervised machine learning model, in response to determining that performance of the supervised machine learning model exceeds performance of the semi-supervised machine learning model.

2. The method according to claim 1, further comprising:
   performing a first feature extraction to extract features from the performance indicator data; and
   detecting, by the unsupervised machine learning model, the plurality of anomalies in the performance indicator data based on the extracted features of the performance indicator data.

3. The method according to claim 1, further comprising:
   determining an anomaly score or ranking for the plurality of anomalies; and
   determining the first subset of the plurality of anomalies based on the anomaly score or ranking.

4. The method according to claim 1, further comprising:
determining the first subset of the plurality of anomalies based on uncertainty sampling of the plurality of anomalies.

5. The method according to claim 1, further comprising:
receiving the labels for the first subset of the plurality of anomalies via a user interface.

6. The method according to claim 5, further comprising:
outputting an indication of the labelling of the second subset of the plurality of anomalies via the user interface;
receiving validation of the labelling of the second subset of the plurality of anomalies via the user interface, or
updating at least one label of the second subset of the plurality of anomalies based on user input received via the user interface.

7. The method according to claim 1, further comprising:
re-training the supervised machine learning model, in response to receiving further labels for the plurality of anomalies via a user interface and/or in response to labelling further anomalies of the plurality of anomalies by the semi-supervised machine learning model.

8. The method according to claim 7, further comprising:
disabling the unsupervised machine learning model and the semi-supervised machine learning model further in response to determining that the re-training no longer improves the performance of the supervised machine learning model, wherein the performance of the supervised machine learning model and/or the performance of the semi-supervised machine learning model is evaluated based on a test dataset comprising the first and second subsets of the plurality of anomalies.

9. The method according to claim 8, further comprising:
re-enabling the unsupervised machine learning model and/or the semi-supervised machine learning model and resuming re-training of the supervised machine learning model, in response to detecting a predetermined degradation in the performance of the supervised machine learning model, when evaluated with the test dataset.

10. The method according to claim 1, further comprising:
detecting and/or classifying, by the supervised machine learning model, at least one anomaly in the performance indicator data.

11. The method according to claim 10, further comprising:
outputting an indication of the at least one anomaly in the performance indicator data.

12. The method according to claim 11, further comprising:
outputting the indication of the at least one anomaly via a user interface; and
receiving validation of the at least one anomaly via the user interface, or
re-training the supervised machine learning model, in response to receiving an indication of incorrect detection and/or classification of the at least one anomaly via the user interface.

13. The method according to claim 10, further comprising:
adjusting at least one parameter of the communication network, in response to detecting and/or classifying the at least one anomaly in the performance indicator data.

14. A non-transitory computer-readable medium comprising a computer-implemented supervised machine learning model obtainable by the method of claim 1.

15. A non-transitory computer-readable medium comprising program code configured to, when executed by a processor, cause an apparatus at least to perform the method according to claim 1.

* * * * *